Dec. 17, 1968 P. C. RICHARDS 3,417,204

TELEPHONE TRUNK CIRCUIT

Filed Nov. 25, 1964 5 Sheets-Sheet 1

INVENTOR
P. C. RICHARDS
BY
R. C. Winter
ATTORNEY

TELEPHONE TRUNK CIRCUIT

Filed Nov. 25, 1964 5 Sheets-Sheet 4

FIG. 5

| STATE NAME | REGISTER CONDITION | | | STATE NO. | REGISTER WILL CHANGE TO THIS STATE | | | | | RELAYS OPERATED BY TIE TRUNK CIRCUIT |
|---|---|---|---|---|---|---|---|---|---|---|
| | | | | | WITH SEIZE PULSE AND WITH RELAY 4E | | WITH RELEASE PULSE AND WITH RELAY 4E | | WITH A DIAL PULSE | |
| | 4STGC | 4STGB | 4STGA | | OPERATED | RELEASED | OPERATED | RELEASED | | |
| RELEASED | RESET | RESET | RESET | 000 | 001 | 111b | NO CHANGE | NO CHANGE | 100 | |
| DIAL TONE | RESET | RESET | SET | 001 | | | 000 | 000 | 101 | 3DT |
| UNUSED | RESET | SET | RESET | 010 | | | 000 | 000 NOTE 1 | | 3CT |
| UNUSED | RESET | SET | SET | 011 | | | 010 | 000 | | 3CT, 3M |
| FALSE DIAL | SET | RESET | RESET | 100 | | NOTE 2 | NO CHANGE | 000 NOTE 2 | | 3CT, 3DT |
| DIALING | SET | RESET | SET | 101 | 110a | 111b | 000 | 000 | | |
| CUT-THROUGH | SET | SET | RESET | 110a | 111a | NOTE 1 | 000 | 000 NOTE 1 | NOTE 1 | 3CT |
| FLASHING | SET | SET | RESET | 110b | | | | | | |
| ANSWER | SET | SET | SET | 111a | | | 110b | 000 | | 3CT, 3M |
| CONNECT | SET | SET | SET | 111b | | | | | | |

NOTE 1: THE CIRCUIT WILL NOT REMAIN IN THIS STATE WITH RELAY 4E RELEASED. WHEN RELAY 4E RELEASES, IT WILL BE RESET TO STATE 000.

NOTE 2: ABOUT 150 MILLISECONDS AFTER RELAY 4E RELEASES, THE CIRCUIT RESETS TO STATE 000.

United States Patent Office
3,417,204
Patented Dec. 17, 1968

3,417,204
TELEPHONE TRUNK CIRCUIT
Philip C. Richards, Colts Neck, N.J., assignor to Bell Telephone Laboratories, Incorporated, New York, N.Y., a corporation of New York
Filed Nov. 25, 1964, Ser. No. 413,900
37 Claims. (Cl. 179—18)

ABSTRACT OF THE DISCLOSURE

In a time division telephone switching system individual switch units are connected to a common control unit and to a central office. However, tie trunks are provided between a switch unit and a particular distant PBX. The tie trunk circuit includes E and M signaling with the distant PBX and is controlled by seize and release signals from the control unit. A plurality of registers are included in the tie trunk circuit and are sequenced through various call states as required of the trunk circuit in response to the successively received seize and release signals and the supervisory signals from the distant PBX.

This invention relates to telephone switching systems and more particularly to trunk circuits for use with private branch exchange (PBX) systems.

An improved electronic private branch exchange system, utilizing common control equipment, is disclosed in the Seley et al. application, Ser. No. 252,797, filed Jan. 21, 1963, now Patent 3,268,669, issued Aug. 23, 1966. In this system a single control unit serves a group of switch units. The switch units, which operate on a time division basis and are as disclosed in Gebhardt et al. application Ser. No. 195,199, filed May 16, 1962, now Patent 3,225,144, issued Dec. 21, 1965, are situated at respective customer's premises and are all connected via transmission cables to the single control unit. Each switch unit serves to interconnect extensions served by the unit. It is also possible to connect an extension to a central office, to another switch unit served by the same control unit (for connection to an extension served by this other switch unit), and to a different PBX system.

Two types of trunk circuits are provided for controlling the connections of extensions served by a switch unit to the three types of facilities described above. A central office trunk circuit is used when a switch unit extension is to be connected to a central office. A tie trunk circuit is used when a switch unit extension is to be connected to either another switch unit of the same system or to a different PBX system. Both central office and tie trunks are connected not only to the switch unit but also to the control unit. The control unit is required, for example, to seize and release a trunk circuit. In addition, the control is necessary for transmitting call signaling information, e.g, dial pulses, from the trunk circuits to the central office, the other switch unit, or the other PBX system.

There is a tendency in electronic common control systems to perform more and more of the required functions in the control unit or common control rather than in the units controlled by it. This technique usually affords a cost saving because the equipment which would otherwise be required in many of the units need not be duplicated. However, it is sometimes advantageous to simplify the control at the expense of the equipment whose operations it governs. Consider the case of the central office and tie trunk circuits. The operation of a central office trunk circuit is necessarily different from that of a tie trunk circuit since each connects the switch unit to a different type of facility. In addition, the system may require many different types of tie trunk circuits dependent on the different types of PBX systems to which communication is required. There are many different types of signaling systems and the operations of various tie trunk circuits must necessarily be different. If all of the trunk circuits are simplified at the expense of the common control the overall cost of the system may increase because the common control may become exceedingly complex. If, on the other hand, the common control is designed to transmit the same type of control signals to the various trunk circuits and the individual trunk circuits are designed to perform the particular functions required to interconnect the different systems, the over-all cost of the PBX system may be reduced. More particularly, a most advantageous system is one in which the only signals required to be transmitted from the common control to the trunk circuits are "seize" and "release." If these signals are also capable of controlling the outpulsing of call signaling information the common control may be reduced in complexity to a considerable extent. While such a scheme may simplify the common control the individual trunk circuits must be capable of operating properly in response to this minimum number of control signals.

It is a general object of this invention to provide an improved trunk circuit scheme for a pivate branch exchange system.

It is a more specific object of this invention to provide an improved tie trunk circuit for a private branch exchange system.

Briefly, in the illustrative embodiment of my invention, applied to a tie trunk circuit, the only commands transmitted from the control unit to the trunk circuit are seize and release signals. These signals not only control the initial seizure of the tie trunk and its final release, but in addition the outpulsing of call signaling information received from a switch unit, the call signaling information being outpulsed from the tie trunk circuit to a distant PBX.

The tie trunk circuit cannot transmit supervisory information directly to the control unit. Supervisory signals from the distant PBX are transmitted through the tie trunk circuit to the switch unit, and from the switch unit to the control unit. The tie trunk circuit therefore must be capable of converting incoming supervisory signals to a type recognizable at the switch unit.

There are many other functions which must be performed by a tie trunk circuit. Dial tone must be supplied to a remote calling party. False dials must be detected, cut-through must be effected, etc. The tie trunk circuit must perform all of the functions required under the control of only seize and release signals.

In my invention all of the required functions are controlled in the following manner. In addition to logic circuitry included in the tie trunk circuit a three-stage register is provided. This register controls the tie trunk circuit to pass through a series of states under control of the seize and release signals. The state of the register controls subsequent action in the tie trunk circuit in accordance with seize and release signals received from the control unit and in accordance with supervisory signals received from the distant PBX. The unique combination of logic circuitry and register stages employed in the invention allows all of the required functions to be performed under the control of a minimum number of command signals.

It is a feature of this invention to provide a trunk circuit having a register responsive to seize and release signals from a control unit for cycling the trunk circuit through a series of states to perform all of the required supervisory and transmission functions.

It is another feature of this invention to provide means in the trunk circuit for transmitting call signaling information to a distant telephone facility under the control of seize and release signals transmitted from the control unit to the trunk circuit.

It is another feature of this invention to provide means in the trunk circuit for converting supervisory signals transmitted between the switch unit and the distant telephone facility.

It is another feature of this invention to block the voice transmission path between the switch unit and the distant telephone facility during dialing.

It is still another feature of this invention to provide means to insure that the trunk circuit does not erroneously appear to be in use.

Further objects, features and advantages of the invention will become apparent upon consideration of the following detailed description in conjunction with the drawing in which:

FIG. 5 is a table depicting the sequential operation of the circuit of FIGS. 3 and 4; and FIG. 6 depicts in detail the gate circuit shown only symbolically in FIGS. 3 and 4.

FIGS. 1 and 2 are a block diagram schematic of an electronic private branch exchange system as disclosed in the above-mentioned Seley et al. and Gebhardt et al. application.

Figure 1:
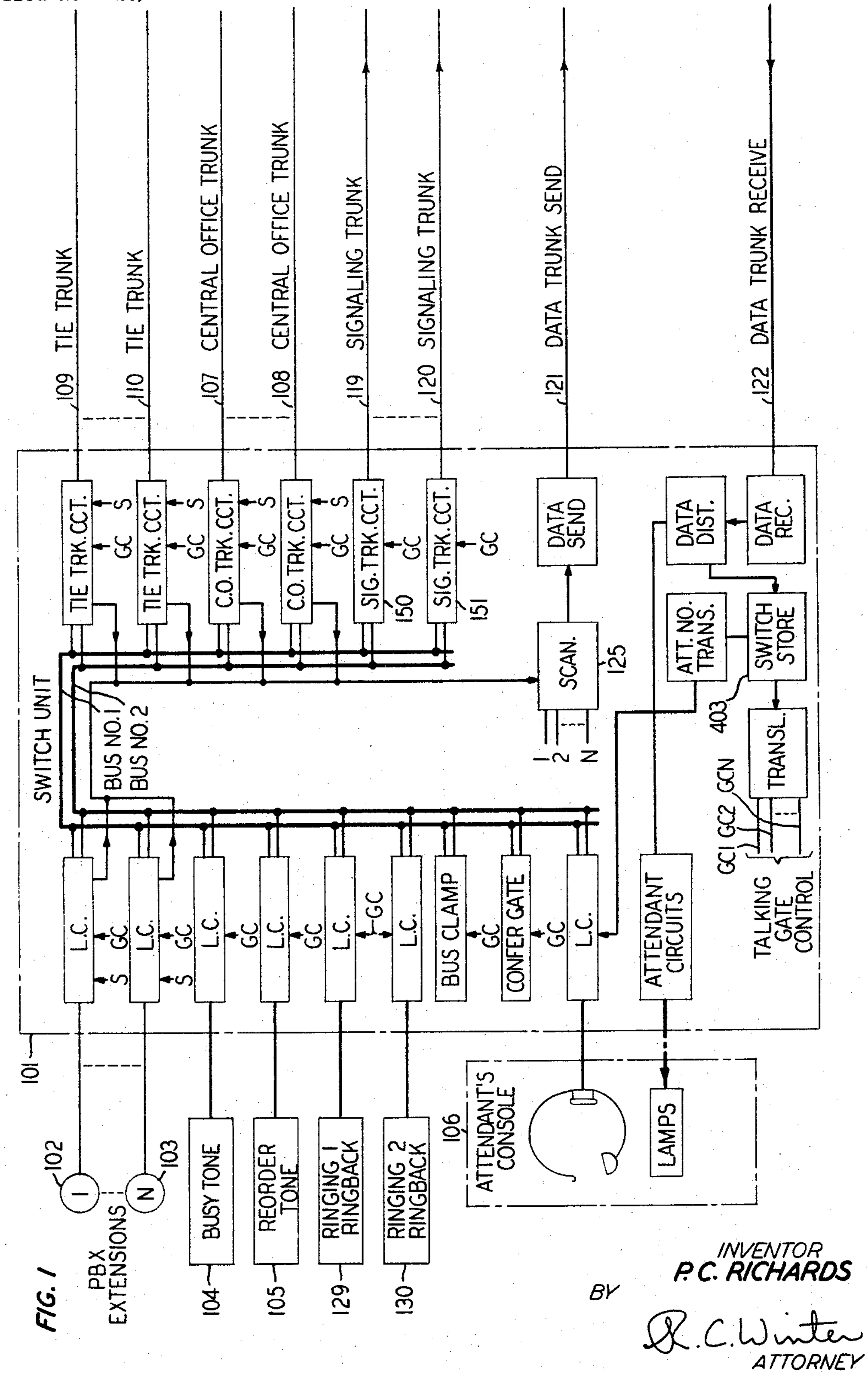
FIGS. 1 and 2 are a schematic representation of an electronic switching system incorporating tie trunks in accordance with my invention.
Figure 2:
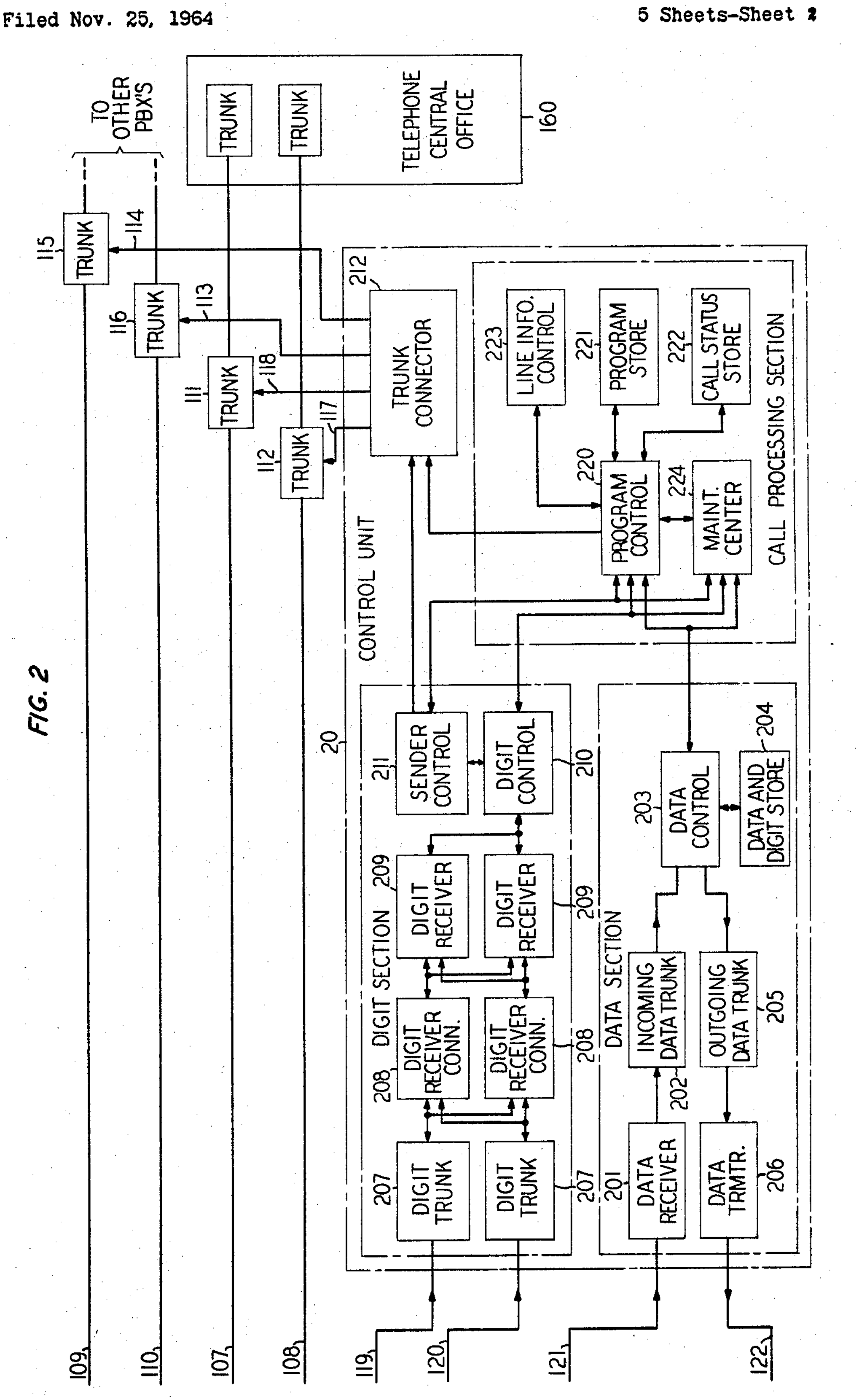

Various of the elements depicted in FIGS. 1 and 2 but not described herein are fully disclosed in these applications to which reference may be made; further to facilitate consideration of these other applications the same reference numerals are employed for the switch unit and Gebhardt et al. application and for the control unit and Seley et al. application.

Control unit 100 serves a first switch unit 101 and other switch units, not shown, but similar to the first. However as is the case in many private branch exchanges there may be many differences in the services provided by these switch units, which may be served by the same control unit. The number of extensions 102, 103, the number of central office trunks 107, 108, tie trunks 109, 110, attendants' consoles 106, etc. are determined by the traffic requirements of the PBX subscriber group and the special services discrete to it.

The normal telephone system tones such as busy tone, ringing tone, ringback tone, etc. are generated at the switch unit by respective sources 104, 105, 129, 130. These tones are connected to the two busses of the switch unit through respective gates LC in the same manner as the PBX extensions and the switch unit trunk circuits are connected to the two busses. As time division switching is employed in this specific embodiment, if two extensions are to be connected to each other their respective line circuits are connected to the same bus in the same numbered time slot under control of switch store 403. If a tone is to be provided to a particular extension, the tone source is connected with the extension to the same bus in the same numbered time slot. Similarly, if an extension is to be connected to a tie trunk, central office trunk or signaling trunk the respective switch unit trunk circuit is connected with the line circuit of the particular extension to the same bus in the same numbered time slot.

Switch unit 101 is connected to the control unit 20 and other telephone systems by three general types of transmission facilities. The first type is represented by central office trunks such as 107 and 108 which connect the switch unit to the central office 160, and the tie trunks such as 109 and 110 which connect the switch unit to other PBX locations. (The other PBXs may be switch units served by the same control unit 20 or may be part of a completely different system, which for example may even be of a type different than the disclosed system.) Both central office trunks and tie trunks are connected to control unit 20. Central office trunk circuits 111 and 112 are controlled by signals transmitted from control unit 20 over conductor groups 113 and 114. Tie trunk circuits 115 and 116 are controlled by signals transmitted from control unit 20 over conductor groups 117 and 118. The signals transmitted from the control unit to a central office or tie trunk circuit control the initial seizure and final release of the trunk circuit. In addition call signaling information transmitted to central office 160 or to another PBX is forwarded from a trunk circuit under command of control unit 20.

The second type of transmission facility connecting switch unit 101 and control unit 20 is represented by signaling trunks 119 and 120. The signaling trunks provide a transmission path from a calling extension such as 102 to signal or digit receivers 209 in the control unit, which receivers are provided for registering call signaling information other than switchboard flashes. Call signaling information in the form of multifrequency tone digit signals which originate at an extension of the switch unit are transmitted over one of the signaling trunks such as 119 and 120 to a digit receiver 209 in the control unit. The tone signals are transmitted from the extension through the switch unit and via the signaling trunk to the digit receiver in the same form as they were originated at the extension. Similarly on an incoming call from the central office or a distant PBX the calling party is connected via a central office or tie trunk circuit to switch unit 101. Call signaling information is transmitted through the switch unit central office or tie trunk circuit to a signaling trunk circuit operated in the same time slot. The call signaling information is again transmitted to a digit receiver in the control unit. The call signaling information received from the central office or the other PBX may not be in tone form, e.g., the call signaling information may comprise dial pulses. The signal or digit receives 209 in the control unit 20 are equipped to handle only tone information. For this reason dial pulses may be converted in the switch unit signaling trunk circuits 150, 151 to tone form. The circuit disclosed in the Gebhardt et al. application Ser. No. 195,199, filed May 16, 1962, now Patent 3,225,144, issued Dec. 21, 1965, is suitable to perform the required conversion. It should be noted that on an incoming call, call signaling information is not directly forwarded from a trunk circuit such as 111 and 115 to the control unit 20. The call signaling information is first transmitted to the switch unit 100 which then directs it over a signaling trunk 119, 120 to the control unit 20.

The third type of transmission facility comprises the data send and data receive trunks 121 and 122. The data send trunk is a unidirectional trunk which connects switch unit 101 and control unit 20 for the purpose of transmitting data relating to changes in supervisory states from the switch unit to the control unit. The data receive trunk 122 is a unidirectional data trunk for transmitting control signals, i.e., concerning the establishment and disestablishment of connections and signals within the switch unit, from control unit 20 to switch unit 101.

FIG. 2 depicts a control unit 20 and various trunk circuits. Central office trunk circuit 111 connects central office trunk 107 from switch unit 101 to the central office. Tie trunk circuit 115 connects tie trunk 109 from the switch unit to another PBX. The details of both trunk circuits are of course dependent on the type of facility to which they are connected. Signaling trunks 119 and 120 are connectable through digit trunks 207 and connectors 208 to signal receivers 209. The call signaling information registered in a signal or digit receiver 209 comes from an extension served by switch unit 101 or a calling party situated at a distant PBX or served directly by the central office, the calling party in either of the latter two cases being connected through trunk circuit 111 or 115 to switch unit 101 and from switch unit 101 to a signal receiver 209 by one of signaling trunks 119 and 120.

Trunk connector 212 includes a seize and release circuit which, under control of program control 220, controls the initial seizure and final release of all trunk circuits such as 111 and 115. Trunk connector 212 also transmits information from sender control 211 to trunks, such as 111 and 115. In the case of a call originating at switch unit 101 the call signaling information must be forwarded to the remote PBX or the central office. The call signaling information is transmitted over a signaling trunk and registered in one of the signal receivers 209. The call signaling information stored in a receiver 209 is transferred through the digit control circuit 210 and sender control circuit 211 to the trunk connector 212 and thence is outpulsed over conductor 113 or 117 to trunk circuit 111 or 115 and from it to the central office or the other PBX. Thus, each trunk circuit is connected to the control unit 20 by only one type of facility, namely, that used to transmit seize and release signals and call signaling information is forwarded to a trunk circuit by the transmission of successive seize and release signals.

Figure 3:
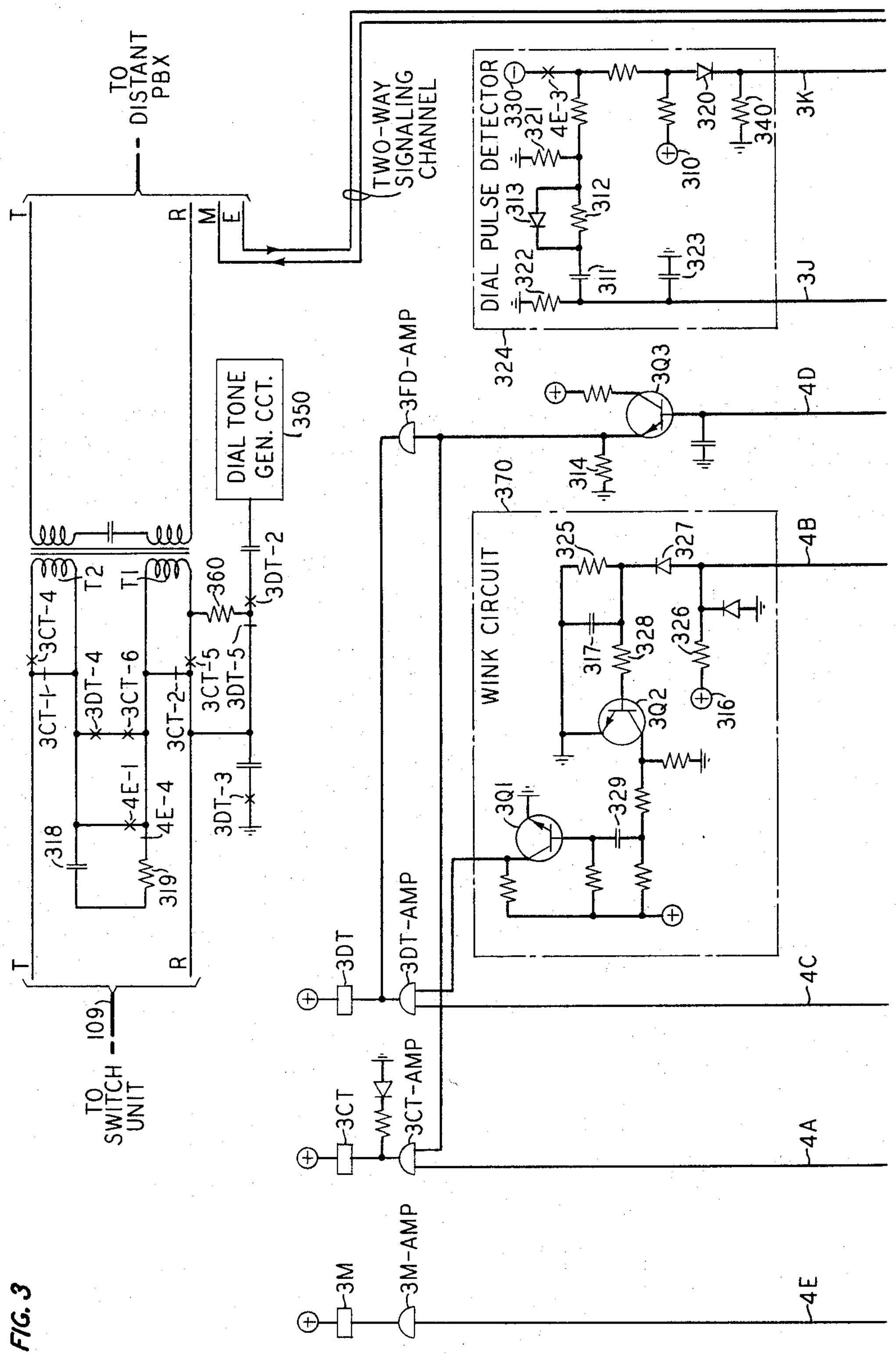
FIGS. 3 and 4 are a schematic representation of one illustrative embodiment of a tie trunk in accordance with my invention, as incorporated in the system of FIGS. 1 and 2.
Figures 4, 6A, 6B:
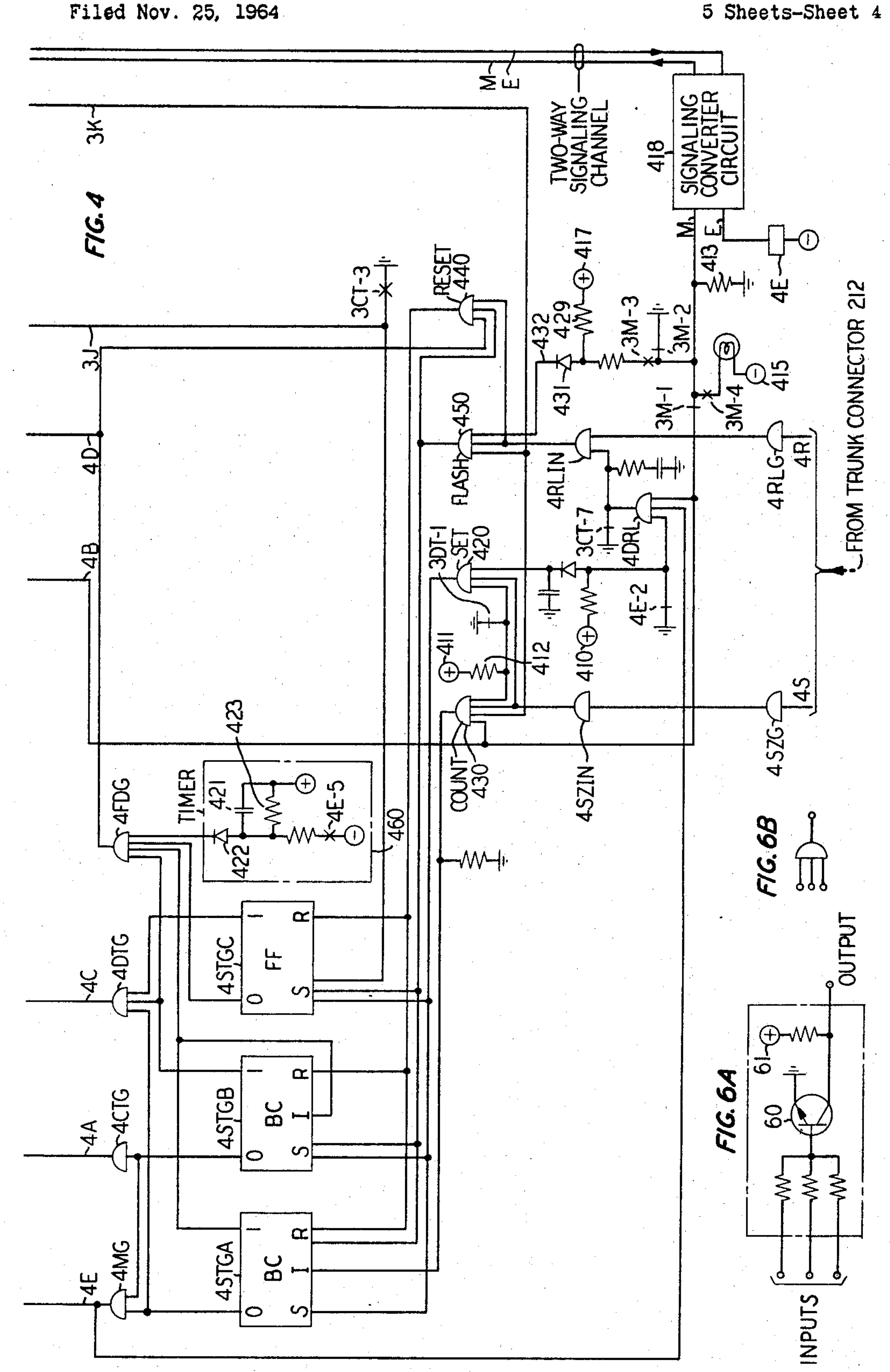

A tie trunk circuit 115 incorporating the principles of my invention is shown in FIGS. 3 and 4. This circuit connects a trunk such as 109 to a distant PBX, with E and M signaling being used for transmitting supervisory information between the two private branch exchanges. In E and M signaling, as is well known in the telephone art, signals are applied to an M conductor by the trunk circuit in accordance with the state of the trunk circuit when the distant PBX must be apprised of a change of state. Similarly, supervisory information from the distant PBX is received on an E lead. The E and M leads are connected through a signaling converter circuit 418 to define a two-way signaling channel to the distant PBX. The particular signaling converter circuit 418 used is dependent upon the transmission medium employed between the two PBX's, and any of the conventional media and associated converter circuits may be used with the tie trunk circuit of FIGS. 3 and 4. The details of E and M signaling will become apparent below upon consideration of the operation of the tie trunk circuit.

The tie trunk circuits of FIGS. 3 and 4 is connected to three separate units. The tie trunk circuit is connected to the distant PBX by both tip, T, and ring, R, conductors and the two-way signaling channel used for the transmission of supervisory information. The tie trunk circuit is also connected to switch unit 101 by tip and ring conductors. Finally, the tie trunk circuit is connected to the control unit by two conductors over which seize and release signals are received. As will now be described, although the tie trunk circuit has numerous functions to perform, all may be controlled in accordance with an aspect of my invention by the transmission of only seize and release signals from the control unit 20. While the illustrative embodiment of the invention is a tie trunk circuit with E and M signaling capabilities, it will be apparent to those skilled in the art that similar tie trunk circuits may be designed where other signaling schemes are employed, and central office trunk circuits may be designed along the same lines. The common denominator of all of the trunk circuits is that they are controlled to perform their respective and unique functions solely by the receipt of seize and release signals from the control unit. The technique of cycling any trunk circuit through the required states by the use of only seize and release signals transmitted from the control unit allows a simplified control unit which is compatible with numerous types of trunk circuits.

GENERAL DESCRIPTION

The tie trunk circuit of FIGS. 3 and 4 is connected between a tie trunk circuit 109 in the switch unit 100 and a distant PBX which is arranged to provide in and out dialing with E and M lead supervision. The tie trunk circuit must therefore convert incoming supervisory signals to loop supervision for recognition at the switch unit, and must convert outgoing supervision from the control unit to E and M lead supervision. The two types of calls which must be handled are incoming calls from the distant PBX and outgoing calls to the distant PBX.

In the case of an incoming call an extension at the distant PBX dials the appropriate tie line code, the tie line is seized and an off-hook signal is passed by the trunk circuit through to the switch unit. The switch unit transmits a data message over data trunk 121 to the control unit to notify the latter that the tie trunk has been seized on an incoming call. The control unit then sets up a connection between the tie trunk and a signal receiver 209. The control unit transmits a data message over data trunk 122 to the switch unit. This message causes the switch unit to operate the switch unit tie trunk circuit connected to the seized tie trunk and one of the signaling trunk circuits in the same time slot. The two switch unit trunk circuits are connected to the same bus and in this manner a tie trunk such as 109 may be connected to a signaling trunk such as 120. In the control unit, digit receiver conductor 208 connects signaling trunk 120 to digit receiver 209. The control unit causes trunk circuit 115 (this trunk circuit being shown in detail in FIGS. 3 and 4) to return dial tone to the distant extension. (If dialing starts before dial tone has been returned to the distant extension, the trunk circuit will prevent the call from being completed to protect against the completion of a call to the wrong extension.)

As the extension dials an extension number the dial pulses are repeated by the trunk circuit and transmitted to the switch unit. They are converted by the switch unit to tone signals and sent to the control unit where they are recorded in digit receiver 209. During the dialing interval there is no voice transmission path between the distant PBX and the switch unit in order to eliminate transient signals other than dial pulses. When dialing is completed the control unit causes the trunk circuit to cut through the tie trunk from the distant PBX to the switch unit for transmission purposes. The switch unit then returns ringback, busy tone, or reorder tone to the calling party in the ordinary manner by operating the line circuit of the particular tone source and the switch unit tie trunk circuit in the same time slot. If the call is completed by the switch unit extension going off-hook, supervision is returned to the distant PBX by the control unit through the trunk circuit 115. In this talking condition, flashes may be repeated in either direction by the trunk circuit, and may also be detected at the switch unit in the ordinary manner. The trunk circuit is restored to normal when both ends return on-hook supervision.

On an outgoing call the switch unit extension initiates a call in the ordinary manner. The extension is connected through the respective line circuit, one of the signaling trunk circuits and a respective signaling trunk to a signal receiver in the control unit. When the appropriate code is registered in the signal receiver the control unit seizes the tie trunk. The control unit causes second dial tone to be returned to the extension through the signal receiver in the ordinary manner. The calling party then dials the extension number desired at the distant PBX. When the dialing is completed and registered in the assigned signal receiver, the control unit, by sending seize and release signals to the tie trunk circuit of FIGS. 3 and 4, controls the outpulsing of the called number through the trunk circuit to the distant PBX. The control unit then causes the switch unit to connect the calling extension to the tie trunk. When the distant PBX has made the connection to the called extension and it has answered, off-hook supervision is returned to the trunk circuit and is passed through it to the switch unit. From this point the remainder of the call is handled in the same manner as for incoming calls.

DETAILED DESCRIPTION

The following detailed description is presented in seven parts:

(1) Trunk Circuit Logic
(2) Incoming Calls
(3) Outgoing Calls
(4) Distant Party Disconnect
(5) Switch Unit Party Disconnect
(6) Flashes
(7) Trouble Conditions

1. *Trunk circuit logic*

The basic gate circuit used in the illustrative embodiment of the invention is shown in detail in FIG. 6A, FIG. 6B showing the symbolic notation for the gate used in FIGS. 3 and 4. The operation of the gate may be described succinctly as follows: The output is at a low potential only if at least one input is high. If all three inputs in FIG. 6A are at low potentials the base-emitter junction of transistor 60 is not forward biased. Consequently, the transistor remains off and the potential of source 61 appears at the output terminal. If on the other hand a positive potential is applied to at least one of the three input terminals the base-emitter junction is forward biased and the output terminal is shorted through the transistor to ground.

The trunk circuit includes one flip-flop element 4STGC and two binary counter elements 4STGA and 4STGB. Flip-flop 4STGC operates as follows: When a positive pulse or step is applied to one of the three set (S) inputs the flip-flop is switched to state 1, the 1 input is high in potential and the 0 output is low in potential. When the flip-flop is reset to the state 0 by the application of a positive transient to the reset (R) input, the 0 output goes high and the 1 output goes low. The two binary counters operate in a similar manner except that each counter has an additional input (I). A negative transient applied to the I input of either counter causes the state of the counter to switch.

The two binary counter stages and the flip-flop together have eight possible states as seen in the table of FIG. 5. Each of the states represents a condition of the tie trunk as indicated by the state names. Various relays in the trunk circuit are operated in each state. A 1 in any state number refers to the respective counter or flip-flop stage being set and a 0 corresponds to it being reset.

The tie trunk register, comprising the one flip-flop and two counter stages has three basic input signals. Two of these are the seize and release pulses from the control unit. The third comes from relay 4E which is operated by the potential on the E lead from the signaling converter circuit, the operation of relay 4E representing supervision from the distant end of the tie trunk. The three relays which are operated by the tie trunk register are relays 3DT, 3CT and 3M. The major function of relay 3DT is to apply dial tone to the tie trunk extended to the distant PBX. Relay 3CT, the cut-through relay, provides a transmission path from the distant PBX to the switch unit when dialing is completed, and relay 3M generates the supervision sent out to the distant PBX.

The table of FIG. 5 indicates the various trunk circuit states and shows the relays operated in each state. The table also shows how the circuit sequences from one state to the next with seize, release, and dial pulse inputs. The seize pulse, with relay 4E operated, normally is used to advance counter stages 4STGA and 4STGB. When relay 4E is released the seize pulse sets all three stages. The release pulse normally resets all three stages except in the two cases when both relays 3M and 4E are operated. In these two cases a flash condition may occur and the circuit switches to the 110 or 010 state. A dial pulse is used to set flip-flop 4STGC.

2. *Incoming calls*

On an incoming call the party at the distant PBX dials the appropriate code and when the tie trunk is selected an off-hook signal will be received on the E lead. The off-hook (ground) signal on this lead controls the operation of relay 4E. Contacts 4E–1 close and the tip and ring conductors of the tie trunk extended to the switch unit are shorted through contacts 3CT–1, 4E–1 and 3CT–2. The loop closure at the switch unit is detected by scan circuit 125, and the off-hook condition is sent in a data message to the control unit to notify it that the tie trunk has been seized by the distant PBX. The control unit generates a data message which is sent to the switch unit to set up the connection of the tie trunk to one of the signal receivers over one of the signaling trunks and through the switch unit. After the connection has been established the control unit transmits a seize pulse to the trunk circuit over lead 4S.

Seize and release conductors 4S and 4R are normally high in potential, the outputs of inverters 4SZG and 4RLG thus normally being low. Seize and release pulses are both ground potentials. When the first seize pulse is applied to conductor 4S the output of inverter 4SZG goes high. Gate 4SZIN is another inverter and consequently its normally high output goes low. The output of gate 4SZIN is an input of both set gate 420 and count gate 430. The output of each of these gates is normally low since the output of gate 4SZIN is normally high. Since relay 4E is operated contacts 4E–2 are open and the rightmost input of the set gate is no longer shorted to ground. This input is instead at the positive potential of source 410. Consequently the output of the set gate remains low even though its middle input goes low when the output of gate 4SZIN goes low. The three other inputs of the count gate however are all connected to ground potential at this time, and when the input from gate 4SZIN goes low the output of the count gate goes high. The three other inputs of the count gate are low at this time for the following reason. While diode 320 is normally forward biased by positive source 310 for applying a positive potential to conductor 3K, with contacts 4E–3 closed negative source 330 reverse biases the diode. Consequently conductor 3K, one of the inputs of the count gate, is held at ground potential through resistor 340. Relay 3DT is unoperated, contacts 3DT–1 are closed and the rightmost input of the count gate is at ground potential. The conductor 4B input of the count gate is also at ground potential since this conductor is connected through normally closed contacts 3M–1 and 3M–2 to ground.

The register stages are initially in state 000 with each of elements 4STGA, 4STGB and 4STGC being reset. As seen from the table when the register is in this condition and a seize pulse is applied with relay 4E operated the system sequences to state 001. The output of the count gate goes high when the seize pulse is applied and at its termination when the count gate output goes low again the negative step applied to the I input of counter 4STGA causes this counter to switch from the 0 to the 1 state. The tie trunk thus switches from the released state to the dial tone state. The two rightmost inputs of gate 4DTG are connected to the 1 outputs of counter 4STGB and flip-flop 4STGC which are both low in potential since these stages are both in state 0. The leftmost input of gate 4DTG is connected to output 0 of counter stage 4STGA. This output is high in the released state and thus the output of gate 4DTG is low in the released state. But when counter 4STGA switches state the 0 output goes low. Since all three inputs of gate 4DTG are now low the output goes high. The output of this gate is connected to one of the inputs of gate 3DT–AMP. The other input of this gate is also normally low since it is shorted to ground through normally conducting transistor 3Q1. Since both inputs of gate 3DT–AMP are normally low, the out put is normally high and relay 3DT is unenergized. However, when the output of gate 4DTG goes high the output of gate 3DT–AMP goes low and relay 3DT is energized. Contacts 3DT–2 and 3DT–3 close to provide dial tone to the distant extension. Current flows from dial tone generator circuit 350 through contacts 3DT–2, resistor 360, winding T1 on the transformer, contacts 3CT–2 and contacts 3DT–3 to ground. Dial tone is transmitted to the distant extension and dialing of the called extension number begins. When relay 3DT first operates contacts 3DT–1 open. Positive source 411 and resistor 412 are no longer shorted to ground. The resistor is connected to one of the inputs of both the set and count gates. The outputs of both gates are held low. The purpose of holding the outputs of both gates low is to insure that further seize pulses (even if they erroneously occur) from the control unit have no effect on these gates until dialing has started.

The calling party begins dialing and relay 4E follows the dial pulses. Dial pulse detector 324 detects the pulses and applies a positive potential to conductor 3J during the break of each pulse, i.e., during each release of relay 4E. Relay 3CT is unoperated in state 001 and contacts 3CT–3 are open. Consequently the first positive pulse on conductor 4J sets flip-flop 4STGC. Thus the flip-flop switches to the 1 state, and the register switches from the 001 state to the 101 state. As seen from the table the effect of a dial pulse is to cause the system to switch states in this manner. State 101 is the dialing state. With flip-flop 4STGC now in the 1 state the rightmost input of gate 4DTG is no longer low and the output of the gate goes high. Relay 3DT now releases. As seen in the table in the 101 state none of relays 3CT, 3DT and 3M are operated. Relay 4E follows dial pulses and as contacts 4E–1 open and close the dial pulses are transmitted to the switch unit over cable 109. The dial pulses are converted to tones in the signaling trunk circuit which is being used and the incoming digits are stored in the connected signal receiver.

Due to relay chatter contacts 4E–3 may successively open and close when relay 4E first operates with the seizure of the tie trunk by the distant PBX. It must be insured that positive pulses are not applied to conductor 3J until after the chatter has subsided; otherwise false pulses will be detected. The dial pulse detector is designed to prevent the pulsing of conductor 3J until 5 milliseconds after contacts 4E–3 first close, by which time the chatter has subsided. The pulsing of conductor 3J is derived as follows. Before dialing when contacts 4E–3 are closed capacitor 311 charges from source 330 through various resistances including resistance 312 of relatively large magnitude. The side of the capacitor connected to conductor 3J is at ground potential through resistor 322 and the other side increases in negative potential as the capacitor charges. When relay 4E releases during the break of a dial pulse and contacts 4E–3 open the left side of capacitor 311 immediately rises in potential due to the ground on resistor 321. The left side of the capacitor rises to a positive potential to pulse conductor 3J. When relay 4E operates the negative charging of the capacitor is relatively slow. Diode 313 is reverse biased and resistor 312 is included in the charging path. At least 5 milliseconds elapse before the capacitor has charged sufficiently to generate a pulse on conductor 3J which will set flip-flop 4STGC when contacts 4E–3 open. Consequently the relay chatter has no effect on the circuit. When relay 4E releases during the first dial pulse diode 313 is forward biased by the ground on resistor 321 and a positive pulse is applied to conductor 3J. Capacitor 323 is much smaller than capacitor 311 and only serves to shape the pulse on conductor 3J.

As seen from the table when the tie trunk circuit is in the dialing state none of relays 3CT, 3DT and 3M are operated, and dial pulses have no effect on the state of the circuit. The tie trunk circuit merely repeats the dial pulses and transmits them to the switch unit from which they are forwarded to the control unit. When the control unit has determined that a complete extension number has been received a second size pulse is transmitted on conductor 4S to the tie trunk circuit. Since relay 3DT is now released, the set and count gates 420 and 430 are no longer inhibited from operating by source 411. The set gate is still inhibited however by positive source 410, as it was when relay 4E first operated when the tie trunk circuit was seized, since contacts 4E–2 are open. Again, only the count gate operates and the I input of counter stage 4STGA is triggered once again at the end of the seize pulse. This stage was in the 1 state during dialing and now switches to the 0 state. The 1 output goes low and the negative step triggers the I input of counter 4STGB which switches from the 0 state to the 1 state. Thus the state of the tie trunk switches from the 101 state to the 110 state. This is seen from the table to be the action when a seize pulse is received with relay 4E operated as it is at the termination of dialing. The 110*a* state is the cut-through state. (The reason for the 110*a* and 110*b* notation will become apparent below, but it is sufficient at this point to recognize that the two states are really the same.) With the counter stage 4STGB now in the 1 state the input of inverter 4CTG is low and conductor 4A goes high. Before stage 4STGB switches to the 1 state both inputs of gate 3CH-AMP are low, the rightmost input being connected to ground through resistor 314. But when conductor 4A goes high the output of gate 3CT-AMP goes low and relay 3CT energizes. Prior to the operation of relay 3CT there is no A.C. transmission path from the distant PBX to the switch unit. This is due to the fact that contacts 3CT–4 and 3CT–5 are open. The tip and ring conductors in cable 109 are not connected to each other through primary windings T1 and T2 of the transformer for providing the required transformer coupling for voice transmission. However in the cut-through state contacts CT–4 and ST–5 are closed. The tip and ring conductors in cable 109 are connected to each other through these contacts, primary windings T1 and T2, and contacts 4E–1. The necessary transformer coupling is achieved for voice transmission. The A.C. transmission path is required not only for voice transmission but for providing the proper tone to the calling party.

The control unit then proceeds to make a busy test on the extension dialed and to set up a connection between that extension and the tie trunk. Ringing is provided for the called extension if it is available, and ringback tone is applied to the switch unit tie trunk circuit connected to cable 109. Ringback is thus extended to the calling party. If the dialed extension is busy, busy tone is provided instead. When the switch unit extension goes off-hook a third seize pulse is sent to the tie trunk circuit. As seen from the table with the system in the cut-through state and with relay 4E operated, the seize pulse sequences the system to the 111 state. (The reason for the 111*a* and 111*b* notation will also become apparent below.) The termination of the third seize pulse advances counter stage 4STGA in the ordinary manner and when this stage switches to the 1 state the entire system switches from the 110 state to the 111 state. Counter 4STGB is not advanced since the 1 output of stage 4STGA goes positive rather than negative. In the answer state output 0 of stage 4STGA and output 0 of stage 4STGB are both low. At this time the normally low output of gate 4MG goes high. The output of inverter 3M–AMP goes low and relay 3M operates. Contacts 3M–4 close and the potential of negative source 415 is applied through these contacts and lamp 416 to the M lead to notify the distant PBX that the connection has been completed. The output of gate 4CTG remains high, thus maintaining relay 3CT operated. The trunk circuit remains in the 111 state with relays 3CT and 3M operated until one of the two parties disconnects, the disconnect sequences being described below. (The opening of contacts 3M–1 also controls the operation of the wink circuit as will be described below. Its operation at this time however has no effect other than the pulsing of relay 3DT. The momentary operation of this relay is required in the outgoing call sequence to close contacts 3DT–4. Since these contacts are now already shorted by closed contacts 4E–1, the pulsing of relay 3DT has no effect on the system.) In the 111 state even if the control unit sends additional seize pulses to the trunk circuit, the operation of count gate 430 is inhibited by the positive source 316 applied to conductor 4B, this conductor being no longer grounded through contacts 3M–1 and 3M–2 since relay 3M is operated in the 111 state.

3. *Outgoing calls*

On an outgoing call the switch unit extension dials the code of the particular tie trunk desired and when the tie trunk is selected by the control unit a seize pulse is transmitted to it. The system is initially in the 000 state. With relay 4E unoperated as seen from the table the seize pulse switches the system to the 111 state. The seize pulse has no effect on the count gate 430. Because relay 4E is unoperated and contacts 4E–3 are open source 330 no longer reverse biases diode 320. Conductor 3K is no longer at ground potential but is instead held at a positive potential by source 310. Conductor 3K is one of the inputs of the count gate and since this conductor is high in potential the output of the count gate remains low independent of the application of the seize pulse and the output of gate 4SZIN going low. However when the output of this gate goes low all three inputs of the set gate 420 are low, the other two inputs being connected to ground through contacts 3DT–1 and contacts 4E–2 respectively. The output of the set gate is conneted to a set input of each of stages 4STGA, 4STGB and 4STGC and thus the register is switched from the 000 state to the 111 state.

While the system is thus switched to the connect state 111*b* it is seen that this state is the same as the answer state 111*a*. Again relays 3M and 3CT operate. Contacts 3M–4 close and the negative potential of source 315 is applied through these contacts to the M lead to notify the distant PBX of the tie trunk seizure. The energization of relay 3M also controls the operation of the wink circuit. The wink circuit is a monopulser which causes normally conducting transistor 3Q1 to turn off for 200 milliseconds. Conductor 4C is normally low and thus one input of gate 3DT–AMP is normally low. Transistor 3Q1 is normally conducting and thus the other input to the gate is also normally low. But when the wink circuit operates this other input of the gate goes high for 200 milliseconds, the output of the gate goes low, and relay 3DT is energized. The wink circuit is triggered by the initial operation of relay 3M. Conductor 4B is normally at ground potential since contacts 3M–1 and 3M–2 are normally closed. The ground potential on conductor 4B maintains transistor 3Q2 off and transistor 3Q1 on. However when relay 3M operates, the ground potential is removed from conductor 4B, source 316 causes transistor 3Q2 to turn on through resistors 326 and 328, and transistor 3Q1 to turn off. Transistor 3Q2 remains on until relay 3M finally releases. Transistor 3Q1 remains off however for only 200 milliseconds due to the charging of capacitor 329.

As will be seen below dial pulses are outpulsed to the distant private branch exchange by successive operations of relay 3M. The wink circuit should not operate during out-pulsing. To prevent the operation of the wink circuit during outpulsing, capacitor 317 in the wink circuit is provided. When relay 3M first operates on an outgoing call and the ground potential is removed from conductor 4B, capacitor 317 charges rapidly from source 316 because the magnitude of resistor 326 is relatively small. The capacitor rapidly charges and turns on transistor 3Q2. During each dial pulse in the outpulsing sequence relay 3M is unoperated. Were capacitor 317 to discharge, at the termination of each dial pulse when relay 3M reoperates the wink circuit would function once again. However capacitor 317 does not discharge during each dial pulse for the following reason. The charging path for the capacitor includes resistor 326 and since this resistor is small in magnitude the charging is rapid. During each dial pulse however conductor 4B is grounded and diode 327 is reverse biased. The discharge path for the capacitor now includes resistor 325 rather than resistor 326. Resistor 325 is large in magnitude, and in fact 150 milliseconds are required to discharge the capacitor through this resistor. Since a dial pulse has a duration considerably less than 150 milliseconds capacitor 317 does not discharge. Transistor 3Q2 remains on during the entire outpulsing sequence. Consequently transistor 3Q1 turns off for only one 200-millisecond period—at the beginning of the outgoing call sequence.

Relay 3DT remains operated or "winks" for 200 milliseconds. Contacts 3DT–4 are closed for this time interval. The tip and ring conductors in cable 109 are connected to each other through these contacts, contacts 3CT–4, 3CT–5 and 3CT–6, and windings T1 and T2. The closing of the tip and ring loop notifies the switch unit that relay 3M has operated. A data message to this effect is transmitted to the control unit which can then being outpusing after the wink has terminated and relay 3DT has released. It should be noted that although contacts 3DT–2 are closed for 200 milliseconds dial tone is not extended to the distant PBX because contacts 3CT–5 and 3DT–3 are closed, shorting the dial tone to ground.

As the calling party in the switch unit dials the extension of the called party at the distant PBX, the signaling information is registered in one of the signal receivers. The control unit controls the outpulsing to the distant PBX by applying successive release and seize signals to the tie trunk circuit. The first release pulse which is applied to conductor 4R causes the output of the gate 4RLG to go high. Initially both inputs of gate 4RLIN are low, one of the inputs being connected through contacts 3CT–7 to ground and the other being connected to the normally low output of gate 4RLG. When the output of gate 4RLG goes high the normally high output of gate 4RLIN goes low. Although the output of this gate is connected to one of the inputs of the flash gate 450, the low potential has no effect on this gate. With relay 4E released and contacts 4E–3 open conductor 3K is at a positive potential and the output of the flash gate remains low. This output is one of the inputs of the reset gate 440 which thus remains low. The rightmost input of the reset gate is connected to the output of gate 4FDG which is also at a low potential when the system is in the 111 state since the two inputs to this gate connected to the respecive 1 outputs of stages 4STGA and 4STGB are both high. When the output of gate 4RLIN goes low all three inputs of the reset gate are low and the output goes high. The output of this gate is connected to a reset terminal of each of stages 4STGA, 4STGB and 4STGC and the system switches to the 000 state. As seen from the table when the system is in the 111 state. Counter 4STGC is not advanced since the 1 de-energized the system switches to the 000 state. In this state none of the 3CT, 3M and 3DT relays are operated and thus relays 3M and 3CT release. The release of relay 3M removes supervision to the distant PBX to begin the first dial pulse.

At the end of the first dial pulse another seize pulse is transmitted from the control unit to the tie trunk circuit. Since relay 4E is sill released the seize pulse sequences the system to the 111 state as did the first seize pulse applied to the tie trunk circuit. Relays 3CT and 3M again operate. The wink circuit is not reoperated however, as described above, because this seize pulse which is applied to the tie trunk circuit at the end of the first dial pulse is applied before 150 milliseconds have elapsed. Outpulsing continues in this manner with successive applications of release and seize pulses to the tie trunk circuit, the tie trunk circuit switching back and forth between the 000 and 111 states. At the conclusion of dialing the system is in the 111 state with relays 3CT and 3M operated. With relay 3CT operated the transmission path between the distant PBX and the switch unit is completed. The calling party in the switch unit hears the ringback or other appropriate signal applied by the distant PBX to the tie trunk. When the called party at the distant PBX goes off-hook, relay 4E operates because a ground potential is applied to the E lead, and contacts 4E–1 close. Before relay 4E operates, but after the outpulsing has been completed, relay 3CT is operated and the tip and ring conductors in cable 109 are connected together through contacts 3CT–4 and 3CT–5, windings T1 and T2 and the branch comprising contacts 4E–4, capacitor 318 and resistor 319. While an AC path is completed in order that the calling party receive the appropriate tone from the distant PBX, there is no DC path between the tip and ring conductors in cable 109 since capacitor 318 blocks direct current. However when the called party answers and relay 4E operates contacts 4E–4 open and contacts 4E–1 close. These latter contacts short the branch which includes capacitor 318 and direct current now flows through the tip and ring conductors. The direct current flow is detected in the switch unit and the control unit is notified that the distant party has answered. The system is in the connect state 111, which is the same as answer state 111, this latter state being the one in which the system is placed when the incoming call sequence is completed. Thus the system is in the same state (111) at the termination of both incoming and outgoing call sequences.

The reason for including the letters *a* and *b* in the table of FIG. 5 is merely to indicate the sequence of the states in the establishment of incoming and outgoing calls. Thus while the final state in both cases is 111, in the incoming call sequence the last action is the switching of the system from the 110 state to the 111 state, while in the outgoing call sequence the last step is in the switching of the system from the 000 state to the 111 state. Similar remarks apply to the two states 110*a* and 110*b* (the latter state being described below). The *a* and *b* terms are included merely to enable the various sequences to be traced by an examination of the table.

4. *Distant party disconnect*

When the party at the distant PBX goes on-hook the ground potential on the E lead is removed and relay 4E releases. Contacts 4E–1 open and contacts 4E–4 close. Capacitor 318 and resistor 319 now bridge the tip and ring conductors in cable 109 rather than contacts 4E–1. Direct current ceases to flow and the switch unit is notified that the distant party is on-hook. The switch unit sends a data message to the control unit to apprise it of the disconnect. The control unit sends a release pulse to the tie trunk circuit after a time-out period of 1.5 seconds. The time-out is to insure that the distant party has indeed terminated the call rather than having flashed the attendant. In the latter case relay 4E will reoperate as described below to notify the switch unit of the flash.

After 1.5 seconds the release pulse, as seen from the table, switches the tie trunk circuit to the 000 state since relay 4E is released. The operation is identical to that which ensues when a release pulse switches the system from the 111 state to the 000 state during outpulsing on an outgoing call. Flash gate 450 does not operate but reset gate 440 does. The normally low output goes high and sets the register in the 000 state. With the system now in the released state all relays release. When relay 3M releases it returns ground on the M lead to the distant PBX as an on-hook signal. The tie trunk circuit is now in a condition to be seized on another call.

5. *Switch unit party disconnect*

If the extension at the switch unit goes on-hook a data message is sent to the control unit. After a 1.5 second time-out the control unit again sends a release pulse to the trunk circuit. The sequence is not the same however as that following a distant party disconnect because in the latter case relay 4E is released whereas in the case under consideration it is still operated.

As seen from the table a release pulse with relay 4E operated sequences the system to the 110 state. As described above, with relay 4E released when the ouput of gate 4RLIN goes low reset gate 440 operates and flash gate 450 does not. However with relay 4E operated gate 450 operates and gate 440 does not. With relay 4E operated conductor 3K is at ground potential because contacts 4E–3 are closed. With relay 3M operated and contacts 3M–3 and 3M–4 closed, the network comprising negative source 415, positive source 417 and resistors 413, 428 and 429 applies a reverse bias to diode 431. The potential of conductor 432 thus has no effect on gate 450. When the output of gate 4RLIN goes low no inputs of the flash gate are high. The output of this gate goes high and inhibits the output of the reset gate from similarly going high. The output of the flash gate is connected to the set inputs of stages 4STGB and 4STGC, and the reset input of stage 4STGA. The registers are thus switched to the flashing state 110. This state is the same as the cut-through state described above. In this state while relay 3CT remains operated, relay 3M is released, and ground potential is applied through contacts 3M–2 to the M lead as an on-hook signal to the distant PBX.

When the party at the distant PBX goes on-hook the E lead is grounded and relay 4E releases. Again, the on-hook signal is transmitted to the switch unit and from the switch unit to the control unit. However further action by the control unit is not required to sequence the tie trunk circuit to the release state 000. The system automatically switches to this state when relay 4E releases as seen from Note 1 on FIG. 5. When the system is in the 110 state relay 3M is released and ground potential is applied to one input of gate 4DRL over contacts 3M–1 and 3M–2. The output of gate 4MG, an input of gate 4DRL, is low since the input of this gate connected to the output of stage 4STGA is high. The third input to gate 4DRL is high when relay 4E is operated due to the action of positive source 410. But when relay 4E releases and contacts 4E–2 close ground potential is applied to this third input. Since all three inputs to the gate are now low the output goes high. Relay 3CT is still operated and since contacts 3CT–7 do not short the output of gate 4DRL to ground, the high output, connected to an input of gate 4RLIN, causes the output of the latter to go low. The effect is the same as that which is produced when a release pulse is transmitted to the tie trunk circuit. With relay 4E now released flash gate 450 does not operate and reset gate 440 does. The system is thus reset to the 000 state. Relay 3CT releases and the trunk is restored to normal.

6. *Flashes*

When the party at the distant PBX desires to flash the tie trunk he momentarily goes on-hook and then off-hook. Relay 4E releases and then reoperates. As described above because the relay reoperates within 1.5 seconds the switch unit and control unit are notified of a flash condition rather than a release condition. The momentary release of relay 4E does not sequence the system out of the answer or connect state 111.

If the switch unit party desires to flash, the attendant is notified and a message is sent to the control unit. A release pulse is then sent to the tie trunk circuit. Relay 4E is operated and the operation of the circuit is that described above when a release pulse is sent following a switch unit party disconnect. Reset gate 440 does not operate but flash gate 450 does. The system sequences to the flashing state 110. Relay 3M releases but relay 3CT remains operated. As with a switch unit party disconnect the M lead is grounded. With a switch unit party disconnect the control unit sends no additional commands to the tie trunk circuit. In the case of a flash however a seize pulse is sent 0.5 second following the release pulse. As seen from the table with relay 4E operated a seize pulse sequences the system back to state 111. The output of gate 4SZIN goes low, and since the other three inputs to count gate 430 are also low the output of this gate goes high. The output of this gate is connected to the I input of stage 4STGA and the registers sequence from state 110 to 111 at the termination of the seize pulse. In this state relay 3M reoperates. A negative potential is applied to the M lead once again which is the end of the flash to the distant PBX. While the wink circuit operates during this sequence it has no effect because contacts 3DT–4 are shorted by closed contacts 4E–1.

7. *Trouble conditions*

If the calling party at the distant PBX should start to dial before dial tone is delivered, the trunk is arranged to protect against a connection to the wrong extension number. The first dial pulse releases relay 4E as usual. If dial tone has not yet been delivered relay 3DT has not yet operated. The tie trunk circuit is still in state 000 since the first seize pulse has not yet been transmitted to it from the control unit. As seen from the table the effect of a dial pulse when the system is in state 000 is to sequence it to state 100. The dial pulse causes the dial pulse detector to pulse conductor 3J. Since contacts 3CT–3 are open the positive pulse on conductor 3J sets stage 4STGC to the 1 state. The system is switched to the false dial state 100.

As seen from the table relays 3CT and 3DT are now operated. When the system is in the 100 state none of the four inputs to gate 4FDG is at a high potential and the normally low output goes high. The base-emitter junction of transistor 3Q3 is forward biased and the transistor turns on. The output goes high and the outputs of each of gates 3CT–AMP and 3FD–AMP go low. Both relays 3CT and 3DT operate. The output of gate 4FDG is connected to one of the inputs of reset gate 440. Since the input is high the output of the reset gate remains low even if a release pulse is received from the control unit. Thus the system is prevented from returning to the release state 000 by the application of a release pulse to it by the control unit.

With contacts 3DT–4 and 3CT–6 closed, contacts 4E–1 are shorted. Although these latter contacts follow the incoming dial pulses they have no effect on the switch unit since direct current is shorted around these contacts.

The switch unit is designed to apply dial tone to any line or trunk which requests service. On an incoming call dial tone is applied at the switch unit to the tip and ring conductors in cable 109. However, this dial tone is not extended to the distant PBX because contacts 3CT–4 and 3CT–5 in the tip and ring conductors are open since relay 3CT is not operated in the dial tone state 001. In the dial tone state, dial tone is provided by generator circuit 350, current flowing from the generator through contacts 3DT–2, winding T1, and contacts 3CT–2 and 3DT–3 to ground. The reason that the switch unit dial tone is not used is because the AC path is blocked during dialing. However, in the false dial state it is the switch unit dial tone which is extended to the distant PBX rather than the dial tone produced by generator 350. In the false dial state relay 3CT is operated as well as relay 3DT. Since contacts 3CT–5 are closed the dial tone from the generator is shorted to ground through these contacts and contacts 3DT–3. Since contacts 3CT–4 and 3CT–5 are closed dial tone current from the switch unit flows through these contacts, windings T1 and T2, and contacts 3DT–4 and 3CT–6.

The circuit remains in state 100 with the distant party continuously receiving dial tone until he goes on-hook. Seize and release signals have no effect. When the distant party goes on-hook relay 4E releases and the system returns to the 000 state. The distant party must reoriginate the call if dialing begins before dial tone is returned to him.

A timer circuit 460 is included to insure that the system does not sequence from the false dial state to the released state unless the distant party has indeed gone on-hook. It is necessary to insure that a dial pulse does not switch the system to the released state because otherwise it would be seized at the termination of the pulse and erroneous operation would ensue. For this reason as seen from Note 2 in FIG. 5 the system does not switch to the 000 state until relay 4B has been released for 150 milliseconds.

When relay 4E is first operated contacts 4E–5 close and the junction of diode 422 and capacitor 421 rises to a negative potential. The diode is reverse biased and has no effect on gate 4FDG. When relay 4E releases the capacitor begins to discharge through resistor 423. After approximately 150 milliseconds, if relay 4E has not reoperated, the junction of the capacitor and diode is sufficiently positive to forward bias the diode. The diode is connected to one of the inputs of gate 4FDG whose output is high in the false dial state. When the input goes high 150 milliseconds after relay 4E releases the output of gate 4FDG goes low. Since both of relays 4E and 3M are released at this time all three inputs of gate 4DRL are low and the output goes high. The output is not shorted to ground since contacts 3CT–7 are open, relay 3CT being operated. The normally high output of gate 4RLIN goes low. Thus the input of reset gate 440 connected to the output of gate 4RLIN is low. The input of the reset gate connected to the output of the flash gate is also low. Since the output of gate 4FDG is also low the third input of reset gate 440 is low and the output goes high. The registers are thus switched to the 000 state.

With the output of gate 4FDG low once again transistor 3Q3 turns off and relays 3CT and 3DT release. The loop to the switch unit is opened and the switch unit notifies the control unit of the on-hook condition. The control unit sends a release pulse to the tie trunk circuit but it has no effect on the circuit since the circuit is already in the 000 state.

Referring to the table it will be noted that certain boxes are left blank. Others have entries which have not been described above. The two columns which show the effect of a size pulse are left blank for those states in which seize pulses should not be received. Although it is possible to indicate the sequencing of the system when seize pulses are received in these states the control unit does not transmit seize pulses unless they are required and the sequencing is not shown to simplify the table. While similar remarks apply to the release pulses the additional sequencing is shown in the table because in almost all cases the tie trunk circuit is released if a release pulse is received. As described immediately above, with relay 4E operated and the system in the false dial state a release pulse has no effect. The only other release pulses which do not release the system are those which arrive when the system is in state 111 and relay 4E is operated, this sequence having been described above, and those arriving when the system is in unused state 011. States 010 and 011 are unused. It is of course possible that the system will enter these states accidentally. However, state 010 is the same as state 110 since in both only relay 3CT is operated. Thus if the system is accidentally placed in state 010 the operation continues as if it were in state 110. Unused state 011 is the same as state 111 since in both relays 3CT and 3M are operated and if the system is accidentally placed in state 011 the operation continues as if it were in state 111. Thus the system is designed so that the proper sequencing may continue even if it is accidentally placed in one of the unused states.

The system is purposely designed to allow release pulses to switch the circuit to the 000 state in all cases where relay 4E is not operated. The three register stages can accidentally be switched to wrong states through noise or some other type of transient. For this reason the control unit always sends a release pulse to the tie trunk circuit 64 milliseconds before the first seize pulse is transmitted on any call. The release pulse restores the trunk circuit from any abnormal state to the release state so that the starting point is assured for each call.

A serious situation occurs however if the system is accidentally placed in the 111 state. In this state relay 3M is operated and the off-hook supervision on the M lead would prevent any calls from coming in from the distant PBX since the tie trunk would look off-hook. The system is designed to insure that in this case the tie trunk circuit is released when relay 3M first operates. As described above, the wink produced by the opening of contacts 3M–1 causes relay 3DT to operate for 200 milliseconds. Since relay 3CT is also operated in the 111 state the loop to the switch unit is closed through contacts 3CT–2, 3CT–6, 3DT–4 and 3CT–1. After 200 milliseconds the loop opens when relay 3DT releases. The switch unit and control unit expect to receive the wink in the normal call processing but in the abnormal condition the control unit will think that the wink is due to a new incoming call. The normal release pulse is sent to the tie trunk circuit followed by the first seize pulse 64 milliseconds later. The release pulse causes the trunk circuit to switch to the 000 state. The seize pulse, since relay 4E is released, advances the trunk circuit to connect state 111. At the end of the wink the switch unit sends an on-hook message to the control unit since no direct current flows through the tip and ring conductors in cable 109. In response to this message the control unit sends a release pulse to the trunk circuit which resets the circuit in the 000 state, releasing relay 3M and permitting incoming calls.

Although the invention has been described with reference to a specific embodiment the arrangement is merely illustrative of the principles of the invention. Numerous modifications may be made therein and other arrangements may be devised without departing from the spirit and scope of the invention.

What is claimed is:

1. A trunk circuit for a private branch exchange system having a switch unit and a control unit connected to said switch unit, said control unit including means for transmitting seize and release signals to the trunk circuit, comprising communication means for connecting the trunk circuit between said switch unit and a distant telephone facility; supervisory state signaling means connected to said distant telephone facility; a register having a plurality of states including released, dial tone, dialing, cut-through and answer states, said register normally being in said released state; means responsive to a first seize signal from said control unit following an off-hook signal received from said distant telephone facility on an incoming call for switching said register from said released state to said dial tone state and for supplying dial tone from the trunk circuit over said communication means to said distant telephone facility; means responsive to a first dial pulse received from said distant telephone facility to switch said register from said dial tone state to said dialing state; means responsive to a second seize signal from said control unit at the termination of the receipt of dial pulses from said distant telephone facility for switching said register from said dialing state to said cut-through state and for controlling said communication means to allow communication from said switch unit to said distant telephone facility; and means responsive to a third seize signal for switching said register from said cut-through state to said answer state and for controlling the transmission of an off-hook signal to said distant telephone facility.

2. A trunk circuit in accordance with claim 1 wherein said register also has a false dial state and further including means responsive to the receipt of a dial pulse from said distant telephone facility before said register has switched from said released state to said dial tone state for switching said register to said false dial state; means responsive to said register being in said false dial state for inhibiting the switching of the state of said register by seize and release signals from said control unit; means for continuously extending dial tone from said switch unit to said distant telephone facility while said register remains in said false dial state; and means responsive to an on-hook signal of predetermined duration received from said distant telephone facility for switching said register from said false dial state to said released state.

3. A trunk circuit in accordance with claim 1 further including means for transmitting a supervisory signal over said communication means to said switch unit responsive to said reigster erroneously being placed in said answer state; and means responsive to a release signal from said control unit for switching said register from said answer state back to said released state.

4. A trunk circuit in accordance with claim 1 further including means responsive to a first seize signal from said control unit on an outgoing call for switching said register from said released state to answer state; means responsive to successive release and seize signals from said control unit for switching said register back and forth between said released state and said answer state; and means responsive to the successive switching of said register back and forth between said released and answer states for transmitting call signaling information over said supervisory state signaling means to said distant telephone facility.

5. A trunk circuit in accordance with claim 4 further including means responsive to an on-hook signal received from said distant telephone facility followed by a release signal from said control unit for switching said register from said answer state to said released state.

6. A trunk circuit in accordance with claim 5 further including means responsive to a release signal from said control unit while an off-hook signal is being received from said distant telephone facility for switching said register from said answer state to said cut-through state; and means responsive to the receipt of an on-hook signal from said distant telephone facility for switching said register from said cut-through state to said released state.

7. A trunk circuit in accordance with claim 6 further including means for controlling the transmission to said distant telephone facility over said supervisory state signaling means of an on-hook signal while said register is in said cut-through state; and means responsive to a seize signal from said control unit while an off-hook signal is being received from said distant telephone facility for switching said register from said cut-through state to said answer state.

8. A trunk circuit for a private branch exchange system having a switch unit and a control unit connected to said switch unit, said control unit including means for transmitting seize and release signals to the trunk circuit, comprising communication means for connecting the trunk circuit between said switch unit and a distant telephone facility; supervisory state signaling means connected to said distant telephone facility; means responsive to an off-hook signal received from said distant telephone facility on an incoming call for enabling the operation of said communication means between the trunk circuit and said switch unit; means responsive to a first seize signal from said control unit on an incoming call for supplying dial tone from the trunk circuit over said communication means to said distant telephone facility; means responsive to a first dial pulse received from said distant telephone facility for inhibiting the supplying of dial tone to said distant telephone facility; means responsive to the receipt of successive dial pulses from said distant telephone facility for repeating and extending said dial pulses to said switch unit over said communication means; said switch unit being operative to transmit the information represented by said dial pulses to said control unit; means responsive to a second seize signal from said control unit at the termination of the receipt of said dial pulses for enabling the operation of said communication means between said distant telephone facility and said switch unit, said switch unit being operative to connect said communication means to a called extension under command of said control unit; and means responsive to said called extension going off-hook and a third seize signal from said control unit for transmitting an off-hook signal to said distant telephone facility.

9. A trunk circuit in accordance with claim 8 further including means responsive to the receipt of a dial pulse from said distant telephone facility before the supplying of dial tone by the trunk circuit for inhibiting the effect of seize and release signals from said control unit and for extending dial tone over said communication means from said switch unit to said distant telephone facility; and means responsive to an on-hook signal received from said distant telephone facility for transmitting a supervisory signal to the switch unit over said communication means to notify said control unit that said distant telephone facility is on-hook.

10. A trunk circuit in accordance with claim 8 further including means for transmitting a supervisory signal to said switch unit when an off-hook signal is erroneously transmitted to said distant telephone facility to notify said control unit of the erroneous condition; and means responsive to a release signal from said control unit for inhibiting the transmission of said erroneous off-hook signal to said distant telephone facility.

11. A trunk circuit in accordance with claim 8 further including means responsive to a first seize signal from said control unit on an outgoing call for transmitting an off-hook signal to said distant telephone facility; and means responsive to the transmission of successive release and seize signals from said control unit for outpulsing call signaling information to said distant telephone facility.

12. A trunk circuit in accordance with claim 11 further including means responsive to an on-hook signal received from said distant telephone facility for transmitting a supervisory signal over said communication means to said switch unit; and means responsive to a release signal from said control unit while said on-hook signal is being received from said distant telephone facility for transmitting an one-hook signal to said distant telephone facility.

13. A trunk circuit in accordance with claim 12 further including means responsive to a release signal from said control unit while an off-hook signal is being received from said distant telephone facility for transmitting an on-hook signal to said distant telephone facility; and means responsive to the receipt of an on-hook signal from said distant telephone facility following the transmission of said on-hook signal to said distant telephone facility for inhibiting the operation of said communication means.

14. A trunk circuit in accordance with claim 13 further including means responsive to the transmission of a release signal followed by a seize signal from said control unit while an off-hook signal is being received from said distant telephone facility for transmitting a flash signal to said distant telephone facility.

15. A tie trunk circuit for a private branch exchange system having a switch unit; a control unit including means for transmitting seize and release pulses to the tie trunk circuit; and call signaling, supervisory state, and command signal transmitting means connected between said switch unit and said control unit; comprising communication means for connecting the tie trunk circuit between said switch unit and a distant private branch exchange; supervisory state signaling means connected to said distant private branch exchange; a register having a plurality of states; means for changing the state of said register in accordance with the present state of the register, supervisory state signals received from said distant private branch exchange, and seize and release pulses received from said control unit; and means for controlling the transmission of supervisory state signals to said distant private branch exchange and for controlling the operation of said communication means in accordance with the state of said register.

16. A tie trunk circuit in accordance with claim 15 further comprising means for sequencing said register through a different series of states for incoming and outgoing calls until communication is established between said switch unit and said distant private branch exchange, said register being sequenced through the same series of states for incoming and outgoing calls after said communication is established.

17. A tie trunk circuit in accordance with claim 15 further including means responsive to the state of said register for supplying dial tone to said distant private branch exchange on incoming calls, and means for inhibiting communication between said switch unit and said distant private branch exchange while call signaling information is received from said distant private branch exchange over said supervisory state signaling means.

18. A tie trunk circuit in accordance with claim 17 further including means for repeating call signaling information received from said distant private branch exchange over said supervisory state signaling means and for transmitting the repeated call signaling information to said switch unit over said communication means.

19. A tie trunk circuit in accordance with claim 15 further including means for inhibiting changes in the state of said register responsive to supervisory state signals received from said distant private branch exchange until after said supervisory state signals are received for a predetermined time interval to prevent erroneous operation of said register as a result of the initial connection of said distant private branch exchange to the tie trunk circuit.

20. A tie trunk circuit in accordance with claim 19 further including means responsive to the initial connection of said distant private branch exchange to the tie trunk circuit for transmitting a supervisory state pulse to said switch unit over said communication means.

21. A tie trunk circuit in accordance with claim 15 further including means responsive to successive pairs of release and seize pulses from said control unit for controlling the outpulsing of call signaling information to said distant private branch exchange over said supervisory state signaling means, said successive pairs of release and seize pulses further controlling the switching of the state of said register back and forth between only two of said states during said outpulsing.

22. A tie trunk circuit in accordance with claim 15 further including means responsive to an on-hook supervisory state signal received from said distant private branch exchange over said supervisory state signaling means while said register is in a predetermined state for resetting said register, and means for delaying said resetting until said on-hook signal is received uninterrupted for a preselected time interval.

23. A trunk circuit for a private branch exchange system having a switch unit and a control unit connected to said switch unit, said control unit including means for transmitting seize and release signals to the trunk circuit, comprising first communication means connected to said switch unit; second communication means connected to a distant telephone facility; means for coupling said first and second communication means; two-way signaling means for transmitting to and receiving from said distant telephone facility on-hook and off-hook signals; a register having a plurality of states; means for sequencing the state of said register in accordance with seize and release signals from said control unit and in accordance with on-hook and off-hook signals received from said distant telephone facility; means responsive to the state of said register and seize and release signals from said control unit for controlling the transmission of on-hook and off-hook signals to said distant telephone facility; and means responsive to the state of said register for operating said coupling means.

24. A trunk circuit for a private branch exchange system having a plurality of extensions and means for transmitting seize and release signals to the trunk circuit, said trunk circuit comprising first communication means selectively connectable to said extensions; second communication means connected to a distant telephone facility; coupling means for connecting said first and second communication means; two-way signaling means for transmitting to and receiving from said distant telephone facility on-hook and off-hook signals; a register having a plurality of states; means for sequencing the state of said register in accordance with said seize and release signals and in accordance with on-hook and off-hook signals received from said distant telephone facility; means responsive to the state of said register and said seize and release signals for controlling the transmission of on-hook and off-hook signals to said distant telephone facility; and means responsive to the state of said register for operating said coupling means.

25. A trunk circuit for a private branch exchange system having a plurality of extension and means for transmitting seize and release signals to the trunk circuit, said trunk circuit comprising communication means for selectively connecting the trunk circuit between one of said extensions and a distant telephone facility; two-way signaling means for transmitting to and receiving from said distant telephone facility on-hook and off-hook signals; a register having a plurality of states; means for sequencing the state of said register in accordance with said seize and release signals and in accordance with on-hook and off-hook signals received from said distant telephone facility; means responsive to the state of said register for controlling the transmission of on-hook and off-hook signals to said distant telephone facility; and means responsive to the state of said register for operating said communication means.

26. A trunk circuit for a private branch exchange system having a plurality of extensions and means for transmitting seize and release signals to the trunk circuit, said trunk circuit comprising means selectively connectable to said extensions; communication and signaling means connected to a distant telephone facility; a register having a plurality of states; means for sequencing the state of said register in accordance with said seize and release signals and in accordance with on-hook and off-hook signals received from said distant telephone facility; means responsive to the state of said register and said seize and release signals for controlling the transmission of on-hook and off-hook signals to said distant telephone facility; and means responsive to the state of said register for establishing a communication path between one of said extensions and said distant telephone facility.

27. A trunk circuit in accordance with claim 26 further comprising means for sequencing said register through different series of states for incoming and outgoing calls until said communication path is established, said register being sequenced through the same series of states for incoming and outgoing calls after said communication path is established.

28. A trunk circuit in accordance with claim 26 further including means responsive to the state of said register for notifying said distant telephone facility when to start transmitting call signaling information on incoming calls; and means for inhibiting communication between said distant telephone facility and the private branch exchange system while call signaling information is received from said distant telephone facility over said communication and signaling means.

29. A trunk circuit in accordance with claim 28 further including means for repeating call signaling information received from said distant telephone facility and for transmitting the repeated call signaling information to the private branch exchange system.

30. A trunk circuit in accordance with claim 26 further including means for inhibiting changes in the state of said register responsive to an on-hook signal received from said distant telephone facility until after an off-hook signal is received for a predetermined time interval to prevent erroneous operation of said register as a result of an initial off-hook signal transmitted from said distant telephone facility.

31. A trunk circuit in accordance with claim 30 further including means responsive to the transmission of said initial off-hook signal from said distant telephone facility for transmitting a supervisory signal to the private branch exchange system.

32. A trunk circuit in accordance with claim 26 further including means responsive to successive pairs of release and seize signals for controlling the transmission of call signaling information to said distant telephone facility over said communication and signaling means, said successive pairs of release and seize signals further controlling the switching of the state of said register back and forth between only two of said states during the transmission of said call signaling information.

33. A trunk circuit in accordance with claim 26 further including means responsive to an on-hook signal received from said distant telephone facility for a predetermined time interval while said register is in a predetermined state for resetting said register to an initial state.

34. A trunk circuit for a private branch exchange system having a plurality of extensions and means for transmitting control signals to the trunk circuit, said trunk circuit comprising means selectively connectable to said extensions; communication and signaling means connected to a distant telephone facility; a register having a plurality of states; means for sequencing the state of said register in accordance with said control signals and in accordance with on-hook and off-hook signals received from said distant telephone facility; means responsive to the state of said register and said control signals for controlling the transmission of on-hook and off-hook signals to said distant telephone facility; and means responsive to the state of said register for establishing a communication path between one of said extensions and said distant telephone facility.

35. A trunk circuit connected between first and second telephone facilities comprising means for transmitting to and receiving from said second telephone facility on-hook and off-hook signals, a register having a plurality of states, means for sequencing the state of said register in accordance with seize and release signals transmitted to the trunk circuit and in accordance with on-hook and off-hook signals received from said second telephone facility, means responsive to the state of said register and said seize and release signals for controlling the transmission of on-hook and off-hook signals to said distant telephone facility, and means responsive to the state of said register for establishing a communcation path between said first and second telephone facilities.

36. A trunk circuit connected between first and second telephone facilities comprising means for transmitting to and receiving from said second telephone facility on-hook and off-hook signals; means responsive to seize and release signals transmitted to the trunk circuit and to on-hook and off-hook signals received from said second telephone facility for controlling the transmission of on-hook and off-hook signals to said second telephone facility depending upon the prior sequence of on-hook, off-hook seize and release signals transmitted to the trunk circuit; and means responsive to the sequence of on-hook, off-hook, seize and release signals transmitted to the trunk circuit for establishing a communcation path between said first and second telephone facilities.

37. A trunk circuit connected between first and second telephone facilities comprising means for transmitting supervisory signals to and receiving supervisory signals from said second telephone facility, means responsive to control signals transmitted to the trunk circuit and to supervisory signals received from said second telehone facility for controlling the transmission of supervisory signals to said second telephone facility depending upon the prior sequence of supervisory and control signals transmitted to the trunk circuit, and means responsive to the sequence of supervisory and control signals transmitted to the trunk circuit for establishing a communication path between said first and second telephone facilities.

No references cited.

WILLIAM C. COOPER, *Primdry Examiner.*

U.S. Cl. X.R.

179—27